United States Patent [19]

Chen et al.

[11] Patent Number: 4,895,916

[45] Date of Patent: Jan. 23, 1990

[54] WATER TREATMENT POLYMERS AND METHODS OF USE THEREOF

[75] Inventors: Fu Chen, Newtown; William S. Carey, Ridley Park, both of Pa.

[73] Assignee: Betz Laboratories, Inc., Trevose, Pa.

[21] Appl. No.: 215,105

[22] Filed: Jul. 5, 1988

Related U.S. Application Data

[63] Continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^4$ .............................................. C08F 20/42
[52] U.S. Cl. ................................... 526/298; 526/304; 526/318.3
[58] Field of Search ...................... 526/298, 304, 318.3

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,228,979 | 1/1966 | Gaertner | 260/512 R |
| 3,262,903 | 7/1966 | Robertson | 260/37 |
| 3,549,548 | 12/1970 | Newman | 252/181 |
| 3,706,717 | 12/1972 | Siegele | 210/701 |
| 3,799,893 | 3/1974 | Quinlan | 260/2 BP |
| 3,891,568 | 12/1975 | Nishio et al. | 422/15 |
| 3,989,636 | 11/1976 | Domba | 252/181 |
| 3,992,318 | 11/1976 | Gaupp et al. | 252/389 |
| 4,018,702 | 4/1977 | Boffardi | 252/389 |
| 4,029,577 | 6/1977 | Godlewski et al. | 210/701 |
| 4,046,707 | 9/1977 | Smith et al. | 252/180 |
| 4,095,029 | 6/1978 | Fields | 560/87 |
| 4,149,969 | 4/1979 | Robitaille et al. | 252/181 |
| 4,176,059 | 11/1979 | Suzuki | 210/698 |
| 4,207,405 | 6/1980 | Masler et al. | 525/328 |
| 4,209,398 | 6/1980 | Ii et al. | 252/180 |
| 4,288,327 | 7/1981 | Godlewski et al. | 210/698 |
| 4,303,568 | 12/1981 | May et al. | 422/13 |
| 4,324,684 | 4/1982 | Geiger et al. | 252/389 |
| 4,432,879 | 2/1984 | Greaves et al. | 210/699 |
| 4,457,847 | 12/1984 | Lorenc | 210/698 |
| 4,469,615 | 9/1984 | Tsuruoka et al. | 252/180 |
| 4,490,308 | 12/1984 | Fong et al. | 260/513 |
| 4,500,693 | 2/1985 | Takehara et al. | 526/240 |
| 4,546,156 | 10/1985 | Fong et al. | 526/240 |
| 4,560,481 | 12/1985 | Hollander | 210/697 |
| 4,575,425 | 3/1986 | Boffardi et al. | 210/697 |
| 4,640,793 | 2/1987 | Persinski | 210/700 |
| 4,650,591 | 3/1987 | Boothe et al. | 210/700 |
| 4,659,480 | 4/1987 | Chen | 210/697 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,678,840 | 7/1987 | Fong et al. | 525/340 |
| 4,701,262 | 10/1987 | Chen | 210/699 |
| 4,708,815 | 11/1987 | Chen | 252/181 |
| 4,717,499 | 1/1988 | Chen | 252/181 |
| 4,732,698 | 3/1988 | Chen | 252/181 |
| 4,759,851 | 7/1988 | Chen | 210/697 |

FOREIGN PATENT DOCUMENTS

| | | |
|---|---|---|
| 0142929 | 5/1985 | European Pat. Off. . |
| 2522637 | 12/1976 | Fed. Rep. of Germany . |
| 53-075138 | 7/1978 | Japan . |
| 56-155692 | 12/1981 | Japan . |
| 58-7415 | 1/1983 | Japan . |
| 58-9987 | 1/1983 | Japan . |
| 58-147412 | 9/1983 | Japan . |
| 58-154761 | 9/1983 | Japan . |
| 58-171576 | 10/1983 | Japan . |
| 1491701 | 11/1977 | United Kingdom . |

OTHER PUBLICATIONS

Chemical Abstract-78:16850y, 1973.
Chemical Abstract-85:20537p, 1974.
Chemical Abstract-98:203736r, 1983.
Chemical Abstract-99:58708x, 1983.
Alcolac Technical Literature, 1976.
Corrosion, vol. 2, Shreir, 1976.
Hampshire Amino Acid Intermediates, W. R. Grace Co., 1975.

*Primary Examiner*—Joseph L. Schofer
*Assistant Examiner*—N. Sarofim
*Attorney, Agent, or Firm*—Alexander D. Ricci; Gregory M. Hill

[57] ABSTRACT

New composition of monomers and polymers and their methods of use are disclosed. The polymers are water soluble and are composed of repeat units formed from an ethylenically unsaturated compound, and repeat units formed from substituted allyloxy alkylenes.

9 Claims, No Drawings

WATER TREATMENT POLYMERS AND METHODS OF USE THEREOF

CROSS REFERENCE RELATED APPLICATIONS

This is a continuation-in-part of U.S. patent application Ser. No. 037,484 filed Apr. 13, 1987, now U.S. Pat. No. 4,759,851, which is a continuation of U.S. patent application Ser. No. 864,049 filed May 16, 1986, now U.S. Pat. No. 4,659,481, which in turn is a continuation of U.S. patent application Ser. No. 545,563, filed Oct. 26, 1983, now abandoned.

FIELD OF THE INVENTION

The present invention pertains to a composition and method of utilizing same to control the formation and deposition of scale imparting compounds in water systems such as cooling, boiler and gas scrubbing systems.

BACKGROUND OF THE INVENTION

The problem of scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa., pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water to the system, is necessary to prevent, reduce and/or retard formation of the scale imparting compounds and their resultant deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, deposition on the structural parts of a steam generating system causes poorer circulation and lower heat transfer capacity, resulting in an overall loss in efficiency.

SUMMARY OF THE INVENTION

The present invention is directed to new substituted allyl alkylene monomers and polymers produced therefrom for use in water treatment. Specifically, the novel polymers of the invention comprise repeat units having the structure (with the inventive monomer represented as "Monomer h"):

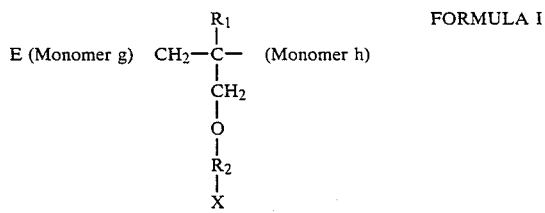

FORMULA I wherein E in the above formula (Formula I) is the repeat unit obtained after polymerization of an ethylenically unsaturated compound or compounds, preferably carboxylic acid, amide form thereof, or lower alkyl ($C_1$–$C_6$) ester or hydroxylated lower alkyl ($C_1$–$C_6$) ester of such carboxylic acid. Compounds encompassed by E include the repeat unit after polymerization of acrylic acid, methacrylic acid, acrylamide, maleic acid or anhydride, itaconic acid, vinyl sulfonic acid, 2-acrylamido-2-methylpropane sulfonic acid; and the like. Water soluble salts forms of the carboxylic acids are also within the purview of the invention.

One or more different structured monomers may be used as the E constitute provided that they fall within the definition of E above given. One such preferred mixture of E monomers would be acrylic acid/2-hydroxypropyl acrylate.

With respect to Monomer h, $R_1$ can be hydrogen or lower alkyl ($C_1$–$C_3$); $R_2$ is a hydroxy substituted lower alkylene group having from 1 to 6 carbon atoms or a non-substituted lower alkylene group having from 1 to 6 carbon atoms; X is selected from the group consisting of CN, $CONR_3R_4$, and COOM, wherein $R_3$ and $R_4$ is independently hydrogen or lower alkyl ($C_1$–$C_3$); and M is hydrogen, any water soluble cation (e.g., $NH_4$, alkali metal) or a lower alkyl ($C_1$–$C_3$).

The molar ratio g:h of the monomers of FORMULA I may fall within the range of between about 30:1 to 1:20, with the g:h molar ratio range of from about 10:1 to 1:5 being preferred.

The number average molecular weight of the water soluble copolymers of FORMULA I may fall within the range of 1,000 to 1,000,000. Preferably the number average molecular weight will be within the range of from about 1,500 to 500,000. The key criterion is that the polymer be water soluble.

Polymer structure of the present invention wherein X is COOM is disclosed in U.S. patent application Ser. No. 545,563, now abandoned, and in U.S. Pat. No. 4,659,481 (Chen, continuation of 545,563) and European publication 0142929 (Chen).

PRIOR ART

U.S. Pat. No. 4,500,693 (Takehara, et. al.) discloses sundry copolymers composed of a (meth)acrylic acid monomer and an allylic ether monomer. Such polymers are disclosed as being useful dispersants and scale preventing agents that may be used in cooling water or water collection systems, etc. In accordance with the '693 disclosure, the allylic ether monomer may include, inter alia, the reaction product of allyloxy dihydroxypropane with various reagents, such as, ethylene oxide, phosphorus pentoxide, propylene oxide, monaryl sorbitan, etc. Polymers in this invention are not disclosed and can not be prepared by the '693 teaching U.S. Pat. Nos. 4,659,480 and 4,708,815 (Chen et. al., continuation of U.S. patent application Ser. No. 545,563) disclose the reaction of allyl glycidyl ether with phosphorus acid ($H_3PO_3$) which results to allyloxy hydroxypropyl phosphite with a distinct C—O—P—H structure. Water soluble copolymer and terpolymer are then prepared using the phosphite containing monomer.

European Publication 0142929 (Chen) discloses water treatment polymers which are in many cases coextensive with those herein disclosed. The polymers are utilized to inhibit calcium phosphate and calcium phosphonate in aqueous systems. They also function to provide a passivated film along treated metal surfaces when they are used conjointly with a water soluble orthophosphate source.

U.S. Pat. Nos. 4,659,481 (Chen) and 4,732,698 (Chen) disclose the utilization of certain (meth)acrylic acid/allyl ether copolymers that may be utilized to provide the elusive passive film along water system metallurgy when used conjointly with an orthophosphate ion source. Most specifically preferred is utilization of an acrylic acid/2-hydroxypropylsulfonate ether copolymer.

U.S. Pat. Nos. 4,659,482 (Chen) and 4,717,499 (Chen) disclose use of (meth)acrylic acid/allyl ether copolymers to simultaneously inhibit corrosion and calcium carbonate deposition in water systems under elevated pH (i.e., 7.5-9.0) and calcium carbonate supersaturation conditions.

U.S. Pat. No. 4,701,262 (Chen) discloses the utilization of acrylic acid/allylhydroxyalkyl ether copolymers in combination with 2-phosphonobutane 1,2,4-tricarboxylic acid to inhibit calcium sulfate and calcium carbonate scale.

U.S pending application Ser. No. 037,484, filed Apr. 13, 1987, now allowed, discloses utilization of acrylic acid/allylhydroxyalkyl ether copolymers to control calcium phosphonate scale in water systems.

Other prior art patents and publications which may be of interest include: U.S. Pat. No. 4,490,308 and U.S. Pat. No. 4,546,156 (Fong, et. al.). In the '308 and '591 patents, sulfonate group bonded to an allyl amide moiety is disclosed. They are different structures than the present invention where a hydroxylated alkylene allyl ether is connected to the carboxylate group.

DETAILED DESCRIPTION OF THE INVENTION

In accordance with one aspect of the invention, new water soluble copolymers and terpolymers, as shown in Formula I hereinafter, are synthesized using the inventive Monomer h. The water soluble copolymers and terpolymers of the invention comprise repeat units having the structures:

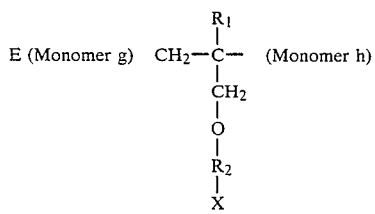

FORMULA I wherein E in the above formula (Formula I) is the repeat unit obtained after polymerization of an ethylenically unsaturated compound or compounds, preferably carboxylic acid, amide form thereof, or lower alkyl ($C_1$-$C_6$) ester or hydroxylated lower alkyl ($C_1$-$C_6$) ester of such carboxylic acid. Compounds encompassed by E include the repeat unit after polymerization of acrylic acid, methacrylic acid, acryamide, maleic acid or anhydride, itaconic acid, vinyl sulfonic acid, 2-acrylamido-2-methylpropane sulfonic acid., and the like. Water soluble salts forms of the carboxylic acids are also within the purview of the invention.

One or more different structure monomers may be used as the E constitute provided that they fall within the definition of E above given. One such preferred mixture of E monomers would be acrylic acid/2-hydroxpropyl acrylate.

With respect to Monomer h, $R_1$ can be hydrogen or lower alkyl ($C_1$-$C_3$); $R_2$ is a hydroxy substituted lower alkylene group having from 1 to 6 carbon atoms or a non-substituted lower alkylene group having from 1 to 6 carbon atoms; X is selected from the group consisting of CN, $CONR_3R_4$, and COOM, wherein $R_3$ and $R_4$ is independently hydrogen or lower alkyl ($C_1$-$C_3$), M is hydrogen, any water soluble cation (e.g., $NH_4$, alkali metal) or a lower alkyl ($C_1$-$C_3$).

The number average molecular weight of the water soluble copolymers of Formula I may fall within the range of 1,000 to 1,000,000. Preferably, the number average molecular weight will be within the range of about 1,500 to about 500,000. Molecular weights of the copolymers are not critical so long as the resulting copolymers are water soluble.

The molar ratio g:h of the monomers of FORMULA I may fall within the range of between about 30:1 to 1:20, with the g:h molar ratio range of from about 10:1 to 1:5 being preferred.

SYNTHESIS OF MONOMERS

With respect to the monomer designated as Monomer g hereinabove, these monomers may be prepared in accordance with well known techniques. For instance, one such possible monomer, acrylic acid, may be prepared by hydrolysis of acrylonitrile or by oxidation of acrolein.

With respect to the inventive allyl monomer (Monomer h), this monomer may be prepared in accordance with the disclosure of U.S. Pat. No. 4,659,481 (column 3 and 4) using allyl glycidyl ether (AGE) as a reactant or via the reaction of allyl alcohol and chloro-β hydroxy butanoic acid. When using allyl glycidyl ether as the reactant, Monomer h may conveniently be prepared via a ring opening reaction of the epoxy group of an allyl glycidyl ether precursor with cyanide. Such reaction is similar to the ethylene cyanohydrin process in the making of acrylic acid. The reaction will produce the nitrile group and hydroxy group on allyl glycidyl ether. The resulting nitrile moiety (I) can be further hydrolyzed with acid or base to give amide (II), carboxylic acid/carboxylate compounds (III/IV), or a mixture of those above, depending on the reaction conditions. The reaction is illustrated by the following equations:

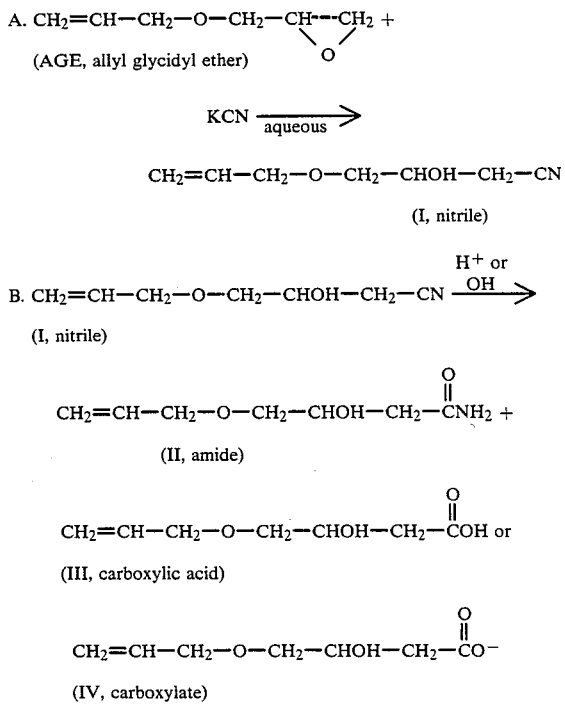

The IUPAC nomenclature for compounds I, II, and III are:
I butanonitrile, 3-hydroxy-4-(2-propenyloxy)
II butanamide, 3-hydroxy-4-(2-propenyloxy)
III butanoic acid, 3-hydroxy-4-(2-propenyloxy)

The structures of compounds I, II, and III/IV were substantiated by 13C NMR spectroscopy and IR spectra. The 13C NMR showed a distinct C≡N peak at 118 ppm for Compound I and the amide (CONH) peak at 176.5 ppm for Compound II. The carboxylate (COO) peak, depending on the extent of neutralization, was observed around 179–181 ppm for Compounds III or IV. The IR spectra also identified the C≡N stretch at 2253 cm-1 for Compound I. The intermediates such as nitrile (I) and amide (II) compounds may be isolated respectively. Since amide is easily hydrolyzed with acid or basic treatment, the resulting carboxylic acid or carboxylate compound (III or IV) is the more common product. In the ring reaction of allyl glycidyl either (AGE, Equation A), a small amount of unreacted AGE may be hydrolyzed to glyceryl allyl ether. Without further purification, both AGE and glyceryl allyl ether can be copolymerized with Monomers g and h in Formula (I). Therefore, they are also within the scope of this invention. During the reaction (equation A and B), a trace of side reaction products were also noted by 13C NMR, which can be separated from the preferred products (III/IV). It is to be understood that the method of removal of these impurities, does not in any way limit the practice of the present invention.

It is noted that hydrogen ion present in the carboxylic acid compound (III) may be replaced with Na, K, $NH_4^+$, or any water soluble cation. The hydrogen ion may also be replaced by an organic amine group or lower alkyl group of from about 1–3 carbon atoms.

The carboxylic acid compound (III or IV) may also be prepared by reacting allyl alcohol with an ester of 3,4 epoxy butanoic acid (V) which can be synthesized from epoxidation of the ester of 3-butenoic acid. The reaction is illustrated by the following equations:

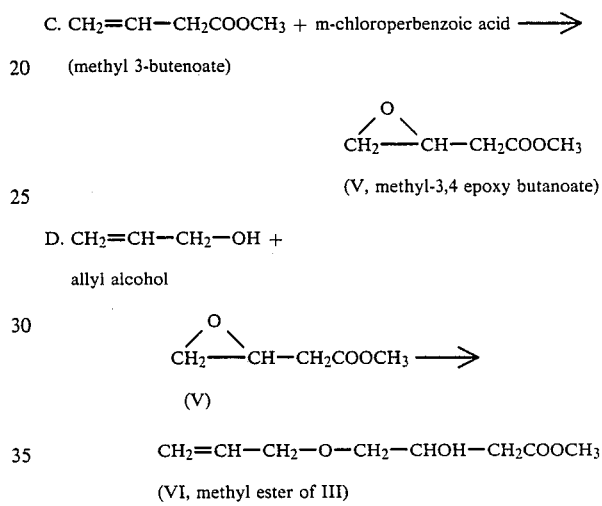

The resulting ester (VI) may be further hydrolyzed into the free acid (III) or used directly for polymerization. Protecting groups other than methyl ester such as ethyl, propyl, amino groups etc. may also be used for this reaction. It is understood that the above methods of synthesis of the monomer h do not limit the methods of preparation of the said monomer.

POLYMERIZATION

The novel monomers of this invention may be polymerized to form homopolymers, copolymers with other monomers of this invention, or copolymers with other vinyl monomers.

After the desired monomers are produced and isolated, polymerization may proceed in solution, suspension, bulk, emulsion or thermal polymerizating form. For instance, in suspension polymerization, the reaction may be initiated by an azo compound or an organic peroxide, with the monomers suspended in hexane or other organic reagents On the other hand, in solution polymerization, the reaction may be initiated via conventional persulfate, peroxide, or vazo type initiators. Commonly used chain transfer agents such as lower alkyl alcohols, amines or mercapto compounds may be used to regulate the molecular weight An accelerator such as sodium bisulfite or ascorbic acid may also be used.

The fact that polymers were formed by the above method was substantiated by viscosity increase and 13C NMR spectroscopy. The 13C NMR spectra showed a broad polymer type backbone (30–45 ppm), complex C-0 region (62–74 ppm), broad carbonyl region (179 ppm), and disappearance of allyl or vinyl peaks.

It should be mentioned that other water soluble terpolymers comprising Monomers g and h of Formula I may also be prepared. For instance, 1-allyloxy-2-hydroxypropyl sulfonate or 2-acrylamido-2--methylpropyl sulfonic acid may be incorporated into a water soluble polymer backbone having repeat units from Monomers g and h. Therefore, they are also within the scope of the invention.

The specific preferred polymer is a copolymer of acrylic acid/allyloxy-3-hydroxybutanoic acid (III)/-(IV) comprising repeat units having the structure:

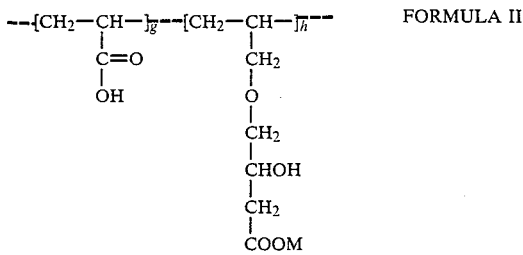

FORMULA II wherein M is the same as in Formula I. The molar ratio g:h of the monomers of FORMULA II may fall within the range of between about 30:1 to 1:20, with the g:h molar ratio range of from about 10:1 to 1:5 being preferred.

The number average molecular weight of the water soluble copolymers of FORMULA II may fall within the range of 1,000 to 1,000,000. Preferably the number average molecular weight will be within the range of from about 1,500 to 500,000. Molecular weights of the copolymers are not critical so long as the copolymers are water soluble.

Deposit Control

The polymers of the invention should be added to the aqueous system, for which deposit control activity or inhibiting the corrosion of metal parts in contact with an aqueous medium is desired, in an amount effective for the purpose. This amount will vary depending upon the particular system for which treatment is desired and will be influenced by factors such as, the area subject to deposition, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein the formation and deposition of scale forming salts is a problem. Other possible environments in which the inventive polymers may be used include heat distribution type sea water desalting apparatus, dust collection systems in iron and steel manufacturing industries, and as a dispersant in the pulp and paper processing industries. Also the polymers could be used as mineral beneficiation aids such as in iron ore, phosphate, coal, and potash recovery.

The water soluble polymers of the present invention can also be used with topping agent components in order to enhance the corrosion inhibition and scale controlling properties thereof. For instance the polymers may be used in combination with one or more kinds of compounds selected from the group consisting of inorganic phosphoric acids and water soluble salts thereof, phosphonic acids and water soluble salts thereof, organic phosphoric acid esters, polyamino carboxylic acids and water soluble salts thereof, and polyvalent metal salts capable of being dissociated to polyvalent metal ions in water, etc. Such topping agents may be added to the system in an amount of from about 1 to 500 ppm. Examples of such agents are disclosed in columns 5, 6, and 7 of U.S. Pat. No. 4,659,481.

EXAMPLES

The invention will be further described with reference to a number of specific examples which are to be regarded solely as illustrative, and not as restricting the scope of the invention.

EXAMPLE 1

Preparation of Butanonitrile, 3-hydroxy-4-(2-propenyloxy)- (I)

Anhydrous magnesium sulfate (61 g, 0.5 mole) and potassium cyanide (66 g, 1.0 mole) were dissolved in 440 ml deionized water at 10+/−2° C. under nitrogen Allyl glycidyl ether (116 g, 1.0 mole) was then added over a period of two hours with cooling to maintain a reaction temperature of 10+/−2° C. After addition, the reaction mixture was stirred at room temperature overnight. The resulting suspension was filtered and the precipitate was further washed with 250 ml of deionized water and filtered. The two filtrates were combined together and concentrated in vacuo. The concentrate was then twice washed with 125 ml of methanol and filtered. The filtrate was concentrated in vacuo to yield a clear liquid.

The 13C NMR showed the product at 22.7, 66.0, 72.1, 72.5, 117.2, 118.6 and 134.7 ppm downfield from external dioxane standard. No other organic species were detected by NMR spectroscopy.

EXAMPLE 2

Preparation of Butanoic acid, 3-hydroxy-4-(2-propenyloxy)- sodium salt (IV)

A solution of 50% aqueous sodium hydroxide (16 g, 0.2 mole), 60 ml deionized water and butanonitrile, 3-hydroxy-4-(2- propenyloxy)- (30 g Example 1, 0.2 mole) were heated at 98+/−2° C. for three hours under nitrogen. The resulting solution was a clear liquid.

13C NMR showed the product at 41.4, 68.0, 71.9, 73.6, 117.9, 134.3 and 179.5 ppm downfield from external dioxane. A trace of minor side products were also noted in the spectra.

EXAMPLE 3

Preparation of Acrylic Acid/Butanoic acid, 3-hydroxy-4-(2- propenyloxy)- sodium salt Copolymer. Molar Ratio 6.0/1.0

A solution of 33% aqueous butanoic acid, 3-hydroxy-4-(2- propenyloxy)- sodium salt (28 g Example 2, 0.05 mole) and 75 ml deionized water was heated to 95+/−2° C. under nitrogen. Acrylic acid (22 g, 0.3 mole) and 20% aqueous sodium persulfate (13 g) were then simultaneously charged over a three and one half hour period. After addition, the batch was held at 95+/−2° C. for two hours.

The resulting clear copolymer solution had a Brookfield viscosity of 24 cps at 25° C. (at 24% solids, pH 3.90). The structure of the copolymer was verified by 13C NMR. The spectrum was characterized by a broad poly (acrylic acid) type backbone (30–45 ppm), broad carbonyl region (179 ppm), and peaks at 38.9, 66.9, 73.7 and 176.2 ppm downfield from external dioxane. No residual monomer was detected.

EXAMPLE 4

Preparation of Acrylic acid/Butanonitrile, 3-hydroxy-4-(2-propenyloxy)- Molar Ratio 6.0/1.0

Butanonitrile, 3-hydroxy-4-(2-propenyloxy)- (7 g Example 1, 0.05 mole) and 90 ml deionized water were heated to 65+/−2 C. under nitrogen. A solution of 2,2′-azobis (N,N′-dimethylene iso-butyramidine) dihydrochloride (Wako VA-044, 7 g, 0.02 mole) and 16 ml deionized water was then charged to the batch. Acrylic acid (22 g, 0.3 mole) was then charged over a one and a half hour period with heating, maintaining a batch temperature of 65+/−2° C. After addition, the batch was held at 65+/−2° C. for one hour.

The resulting clear copolymer solution had a Brookfield viscosity of 11 cps at 24° C. (at 25% solids, pH 1.9). The structure of the copolymer was verified by 13C NMR. The spectrum was characterized by a broad poly(acrylic acid) type backbone (30–45 ppm), broad carbonyl region (179 ppm) and peaks at 22.0, 65.5, 72.3 and 119 ppm downfield from external dioxane. No residual monomer was detected.

EXAMPLE 5

Preparation of Butanoic acid, 3-hydroxy-4-(2-propenyloxy)- potassium salt (IV)

The compound of Example 2 can also be prepared by the following method: Potassium cyanide (33 g, 0.5 mole) was dissolved in 190 ml deionized water at 3+/−2° C. under nitrogen. Allyl glycidyl ether (AGE) (58 g, 0.5 mole) was then added over a period of one hour with cooling to maintain a batch temperature of 5+/−2° C. After addition, the reaction mixture was stirred at room temperature overnight. The reaction was monitored by 13C NMR. The spectra showed the presence of the intermediate nitrile (I, 120.6 ppm), the amide (II, 176.5 ppm), the acid (IV, 179 ppm) compounds, and a minor amount of glyceryl allyl ether (GAE) from the hydrolysis of AGE. The batch was then heated at 98+/−2° C. for thirty hours with a nitrogen purge. A 13C NMR spectrum of the batch at this point showed that the desired product (IV) was obtained along with a minor amount of GAE and a trace of other side products. No amide (II) was detected at this point. The batch was then concentrated in vacuo and extracted with acetone (8×150 g) to yield a taffy-like material. The remaining acetone was decanted off, the residual dissolved in 700 ml deionized water and the resulting solution was concentrated in vacuo. The resulting clear solution was adjusted to 35% solids with deionized water.

The 13C NMR showed the product at 41.3, 67.9, 71.7, 73.5, 118.1, 134.2 and 179.3 ppm downfield from external dioxane. No GAE was detected, but a trace of other minor side reaction products were noted.

EXAMPLE 6

Preparation of Acrylic Acid/Butanoic acid, 3-hydroxy-4-(2-propenyloxy)- potassium salt Copolymer. Molar Ratio 6.0/1.0.

A solution of 30% aqueous butanoic acid, 3-hydroxy-4-(2- propenyloxy)- potassium salt (33 g Example 5, 0.05 mole) and 75 ml deionized water was heated to 98+/−2° C. under nitrogen. Acrylic acid (22 g, 0.3 mole) and 20% aqueous sodium persulfate (13 g) were then simultaneously charged to the flask over a three and one half hour period. After addition, the batch was held at 98+/−2° C. for two hours.

The resulting clear copolymer solution had a Brookfield viscosity of 46 cps at 25° C. (at 25% solids, pH 3.96). The structure of the copolymer was verified by 13C NMR. The spectrum was characterized by a broad poly(acrylic acid) type backbone (30–45 ppm), broad carbonyl region (179 ppm), and peaks at 38.9, 66.9, 73.7 and 176.2 ppm downfield from external dioxane. No residual monomer was detected.

Passivation

Although the polymers of the invention, when used singly, may not adequately inhibit corrosion, the demonstrated efficacy of polymers of similar structure in inhibiting calcium phosphate precipitation is very important. For instance, one successfully established cooling water treatment method provides a passivated film on metal surfaces in contact with the aqueous medium via addition of orthophosphate, organo-phosphonate and an acrylic acid/hydroxylated alkyl acrylate copolymer. Details of such method are disclosed in U.S. Pat. No. 4,303,568 (May et. al.). The entire content of these patents are hereby incorporated by reference. It is expected that the subject copolymers can be substituted for the polymers disclosed in the aforementioned May et. al. and Chen patents so as to provide the important passivated film on the desired metal surfaces.

As is stated in the May et. al. patent, the passive film is provided on metal surfaces in contact with the aqueous medium without substantial attendant deposition formed thereon. A composition containing polymer and orthophosphate and optionally but preferably a phosphonate, polyphosphate and copper corrosion inhibitors is used in order to achieve such passivation. A typical composition contains on a weight ratio basis of polymer to orthophosphate expressed as $PO_4^{---}$ of about 1:8 to 4:1 and preferably about 1:6 to 2:1. When a polyphosphate* is included, the weight ratio of orthophosphate to polyphosphate on a $PO_4^{---}$ basis is 15:1 to 1:3, and preferably 2.3:1 to 1:1. Similarly, if the organophosphonate is included, the ratio of the orthophosphate to the phosphonate expressed as $PO_4^{---}$ to $PO_4^{---}$ is 1:2 to 13:1, and preferably 2:1 to 8:1. Any copper corrosion inhibitor may be included in the composition (0.01 to 5% by weight) in an amount which will be effective for controlling the copper corrosion in a given system: 0.05 to 10 parts per million and preferably 0.5 to 5 parts per million. Similarly, zinc salts may be included if additional protection is needed.

*Handbook of Industrial Water Conditioning, 6th edition, 1962, pages 394–396, Betz Laboratories, Inc., Trevose, PA.

In treating the aqueous systems to provide such passivation, the following dosages in parts per million parts of water in said aqueous systems of the respective ingredients are desirable, with the dosages, of course, being based upon the severity of the corrosion problem foreseen or experienced:

orthophosphate (expressed as $PO_4^{---}$): 2 to 50 parts per million parts of water (ppm) and preferably 6 to 30 ppm;

polymer: 0.3 to 120 ppm and preferably 3 to 25 ppm;

polyphosphate (expressed as $PO_4^{---}$): 0.1 to 30, and preferably 3 to 10, parts per million parts of water;

phosphonate (expressed as $PO_4^{---}$): 0.04 to 20, and preferably 1 to 6, parts per million parts of water.

The preferred rate of application of this treatment to cooling water systems and the ratios of various components depends on the calcium concentration of the cooling water. The treatment is preferably applied in waters having between 15 ppm and 1,000 ppm calcium. Within this range the weight ratio of calcium to orthophosphate is varied from 1:1 to 83.3:1, the weight ratio of polymer to orthophosphate is varied from 1:3 to 1.5:1.

The orthophosphate which is critical to passivation is generally obtained by direct addition. However, it is understood that the orthophosphate can also arise due to reversion of either inorganic polyphosphates or the organo-phosphonates, or any other appropriate source or precursor thereof; however, significant reversion is required.

The above dosages represent the most desirable ranges since most systems will be treatable therewith. Higher dosages are permissible when the situation demands, but of course are most costly. The effectiveness of the inventive treatments are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. Composition of a water soluble polymer comprising substantially repeat units having the structure:

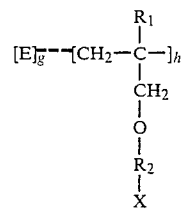

wherein E in the above formula is the repeat unit obtained after polymerization of an ethylenically unsaturated compound or compounds; wherein $R_1$ is hydrogen or lower alkyl ($C_1$-$C_3$); $R_2$ is a hydroxy substituted lower alkylene group having from 1 to 6 carbon atoms or a non-substituted lower alkylene group having from 1 to 6 carbon atoms; X is selected from the group consisting of CN, $CONR_3R_4$, and COOM; wherein $R_3$ and $R_4$ is independently hydrogen or lower alkyl ($C_1$-$C_3$); M is hydrogen, any water soluble cation, or a lower alkyl ($C_1$-$C_3$); the molar ration g:h of said polymer being between about 30:1 to 1:20.

2. Composition as recited in claim 1 wherein E comprises the repeat unit remaining after polymerization of a compound or compounds selected from the group consisting of acrylic acid, methacrylic acid acryamide, maleic acid or anhydride, itaconic acid, sodium vinyl sulfonate, sulfonated styrene, 2-acrylamido-2-methylpropane sulfonic acid, diallyl dimethyl ammonium chloride, lower alkyl ($C_1$-$C_6$) ester or hydroxylated lower alkyl ($C_1$-$C_6$) ester of said acids.

3. Composition as recited in claim 2 wherein E comprises acrylic acid repeat unit and 2-hydroxypropyl acrylate repeat unit.

4. Composition as recited in claim 1 wherein $R_1$ is hydrogen, $R_2$ is 2-hydroxypropylene, and X is CN.

5. Composition as recited in claim 1 wherein $R_1$ is hydrogen, $R_2$ is 2-hydroxypropylene, X is $CONR_3R_4$, and $R_3$ and $R_4$ is independently hydrogen or lower alkyl ($C_1$-$C_3$).

6. Composition as recited in claim 5 wherein $R_3$ and $R_4$ is hydrogen.

7. Composition as recited in claim 1 wherein $R_1$ is hydrogen, $R_2$ is 2-hydroxypropylene, X is COOM, and M is hydrogen, any water soluble cation or a lower alkyl ($C_1$-$C_3$).

8. Composition as recited in claim 7 wherein M comprises a member selected from the group consisting of hydrogen, lithium, sodium, potassium, ammonium, calcium, magnesium, an organic amine group, or an alkyl group having from 1 to 3 carbon atoms.

9. Composition as recited in claim 1 wherein the molar ratio g:h is about 10:1 to about 1:5.

* * * * *